(12) United States Patent 
Martim et al.

(10) Patent No.: US 12,595,814 B1 
(45) Date of Patent: Apr. 7, 2026

(54) SELF-ALIGNING THREADED MOUNTING ASSEMBLY

(71) Applicant: Tractian Technologies Inc, Atlanta, GA (US)

(72) Inventors: Vinicius Martim, São Paulo (BR); Pedro Calori Badini, São Paulo (BR); Flávio Roberto Bizerra Junior, São Paulo (BR)

(73) Assignee: Tractian Technologies Inc, Atlanta, GA (US)

( * ) Notice: Subject to any disclaimer, the term of this patent is extended or adjusted under 35 U.S.C. 154(b) by 0 days.

(21) Appl. No.: 19/297,904

(22) Filed: Aug. 12, 2025

(51) Int. Cl. 
　　*F16B 7/18* 　　(2006.01) 
　　*G01M 15/12* 　　(2006.01)

(52) U.S. Cl. 
　　CPC .............. *F16B 7/18* (2013.01); *G01M 15/12* (2013.01)

(58) Field of Classification Search 
　　CPC .... F16B 7/18; F16B 7/182; F16B 9/05; F16B 9/052; F16B 9/054; F16B 17/006; Y10T 403/3933; Y10T 403/3946; Y10T 403/3981; Y10T 403/3986; Y10T 403/4608; Y10T 403/299; Y10T 403/343 
　　USPC .... 411/389; 403/56, 68, 192, 194, 199, 200, 403/233 
　　See application file for complete search history.

(56) References Cited

U.S. PATENT DOCUMENTS

| | | | | |
|---|---|---|---|---|
| 4,252,458 | A * | 2/1981 | Keen | F16B 7/0406 403/287 |
| 6,296,431 | B1 * | 10/2001 | Miller | F16B 5/0208 411/389 |
| 6,652,208 | B2 * | 11/2003 | Gillis | F16B 5/0208 411/389 |
| 6,880,788 | B2 * | 4/2005 | Stephen | H02G 3/32 24/130 |
| 7,241,097 | B2 * | 7/2007 | Dembowsky | F16B 5/0233 411/389 |
| 7,624,618 | B2 * | 12/2009 | Bader | F16B 35/06 411/382 |
| 8,770,902 | B1 * | 7/2014 | Miller | F16B 5/0208 29/451 |
| 8,854,829 | B1 * | 10/2014 | Bopp | H05K 7/142 174/382 |

(Continued)

*Primary Examiner* — Amber R Anderson 
*Assistant Examiner* — Zachary A Hall 
(74) *Attorney, Agent, or Firm* — Cognition IP, P.C.; Edward Steakley; Justin White

(57) ABSTRACT

A mounting assembly couples a separate mechanical component to a separate mechanical asset and includes a fastening component, sleeve, and insert. The fastening component has a flange and an extending threaded protrusion insertable into a threaded opening of the mechanical asset. The sleeve has wall(s) coupled to an endcap at one end to define an inner volume having a sleeve opening at the opposite end. The endcap includes an opening that allows the threaded protrusion to pass therethrough while the flange remains rotatably within the inner volume. The insert fits within the sleeve opening keeping the flange within the inner volume and has a threaded inner opening that accepts insertion of a threaded portion of the mechanical component such that the mechanical component couples to the mechanical asset at a specific rotational orientation. The mechanical asset can be an industrial engine and the mechanical component can be a vibration sensor.

20 Claims, 10 Drawing Sheets

(56)  References Cited

U.S. PATENT DOCUMENTS

| | | | |
|---|---|---|---|
| 8,920,063 B1 * | 12/2014 | Easley | F16B 21/165 |
| | | | 403/328 |
| 9,212,675 B2 * | 12/2015 | Oetlinger | F16B 7/187 |
| 9,970,190 B2 * | 5/2018 | Benthien | B64C 3/48 |
| 12,165,491 B2 * | 12/2024 | Redaelli | G08B 21/187 |

* cited by examiner

100

132

130

120

110

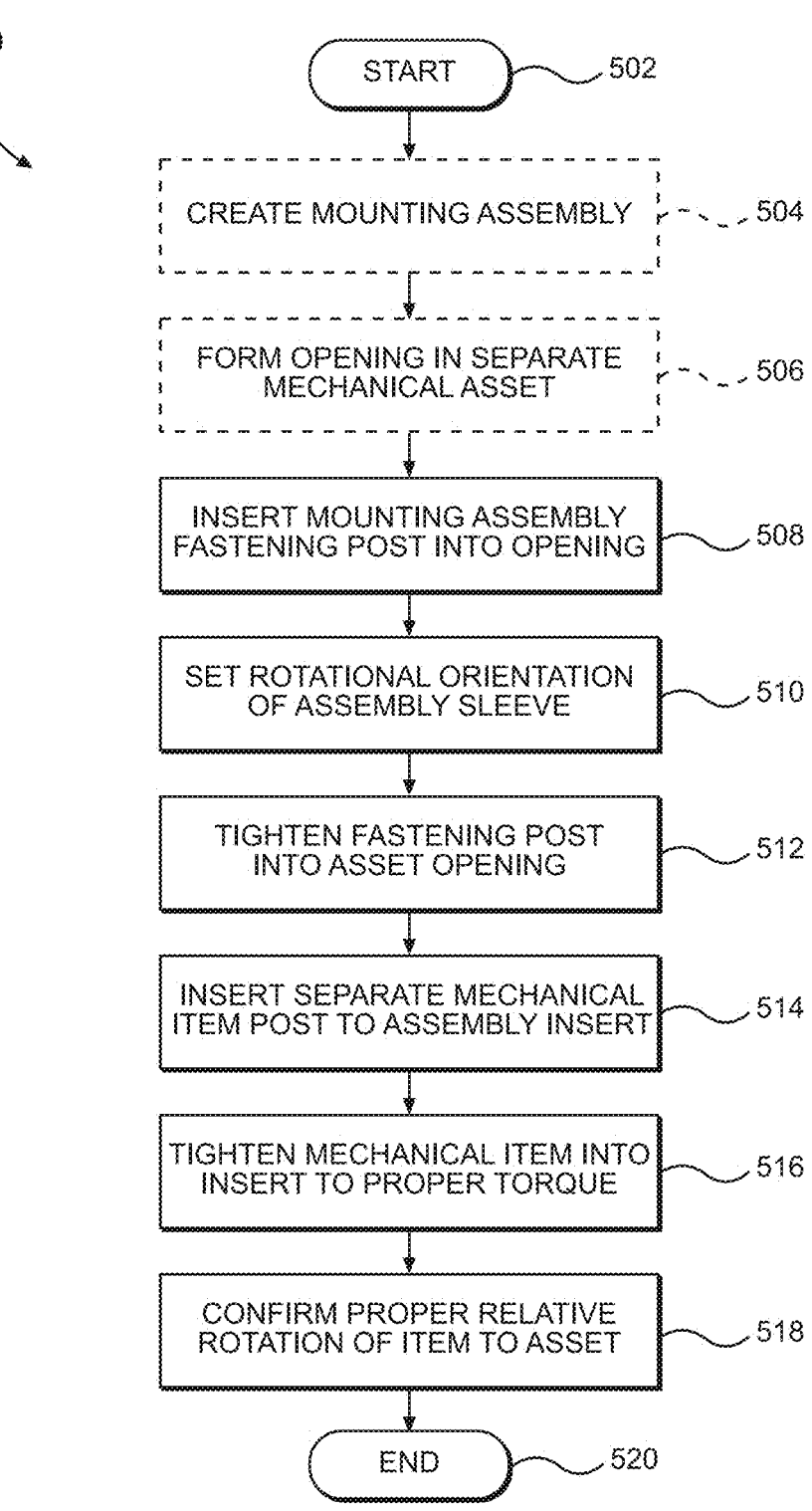

500

START ~ 502

CREATE MOUNTING ASSEMBLY ~ 504

FORM OPENING IN SEPARATE
MECHANICAL ASSET ~ 506

INSERT MOUNTING ASSEMBLY
FASTENING POST INTO OPENING ~ 508

SET ROTATIONAL ORIENTATION
OF ASSEMBLY SLEEVE ~ 510

TIGHTEN FASTENING POST
INTO ASSET OPENING ~ 512

INSERT SEPARATE MECHANICAL
ITEM POST TO ASSEMBLY INSERT ~ 514

TIGHTEN MECHANICAL ITEM INTO
INSERT TO PROPER TORQUE ~ 516

CONFIRM PROPER RELATIVE
ROTATION OF ITEM TO ASSET ~ 518

END ~ 520

FIG. 5

SELF-ALIGNING THREADED MOUNTING ASSEMBLY

TECHNICAL FIELD

The present disclosure relates generally to mechanical coupling arrangements, and more particularly to improved mounting assemblies for coupling mechanical components.

BACKGROUND

Industrial machinery typically involves the implementation of sensors to monitor aspects and performance of machine operations. These can include, for example, vibration, temperature, current, pressure, moisture, and other types of industrial sensors. Many industrial sensors require installation at specific locations and/or orientations relative to machinery to be effective. For example, some vibration sensors must be field installed at a specific rotational orientation relative to any industrial equipment to which it is coupled and intended to monitor.

Unfortunately, it is sometimes difficult to control the final rotational orientation of a given sensor relative to its monitored device. Where threaded mountings are used, for example, the fixed nature of mating threads can determine the final rotational orientation of a sensor. This can then lead to misalignment of the sensor reference axis. While these issues can be corrected by traditional alignment methods such as double nuts or threaded collars, these approaches can leave portions of the thread exposed, which can compromise mechanical strength and reliability under vibration, humidity, and/or chemical exposure. Additionally, these traditional approaches can complicate field maintenance and can lead to loss of orientation during servicing.

Although traditional ways of coupling industrial items with threaded matings have worked in the past, improvements are always helpful. In particular, what is desired are improved threaded coupling arrangements that provide precise rotational alignments for coupled items.

SUMMARY

It is an advantage of the present disclosure to provide improved threaded coupling arrangements that provide precise rotational alignments for coupled items. The disclosed features, apparatuses, systems, and methods relate to self-aligning mounting assemblies, which can include mechanical arrangements having threaded mating components, integrated axis retention during rotational coupling, minimally exposed threaded portions, and adhesive-free interference fits, among other advantageous features. In particular, the disclosed embodiments can involve the use of mounting assemblies having mechanically interlocking fastening components, sleeves, and inserts that facilitate the ready fastening of a mechanical component to a mechanical asset at a specific rotational alignment in a simple and streamlined manner.

In various embodiments of the present disclosure, a mounting assembly can include a fastening component, a sleeve, and an insert. The fastening component can include a threaded protrusion extending from a flange, with the threaded protrusion defining a longitudinal axis and a first diameter and the flange defining a second diameter that is greater than the first diameter. The threaded protrusion can be configured to be rotationally inserted into a threaded opening of a separate mechanical asset. The sleeve can have one or more walls coupled to an endcap at one end thereof to define an inner volume having a sleeve opening at another end opposite the endcap. The inner volume can be configured to hold the flange therein such that the flange is rotatable within the inner volume, and the endcap can include an endcap opening configured to allow the threaded protrusion to pass therethrough while the flange remains within the inner volume. The insert can be fitted within the sleeve opening such that the flange is fully constrained within the inner volume. The insert can include a threaded inner opening aligned along the longitudinal axis of the fastening component threaded protrusion and configured to accept a rotational insertion therein of a threaded portion of a separate mechanical component such that the separate mechanical component is coupled to the separate mechanical asset at a specific rotational orientation relative to the separate mechanical asset.

In various detailed embodiments, the separate mechanical asset can be an industrial engine and the separate mechanical component can be a vibration sensor. Other types of separate mechanical assets and components are also possible. The fastening component can include a tightening feature at a top surface of the flange, and the tightening feature can be configured to facilitate rotational tightening of the threaded protrusion into the threaded opening of the separate mechanical asset. The tightening feature can be configured to be accessed via the threaded inner opening of the insert while the flange is fully constrained within the inner volume of the sleeve. The fastening component and the sleeve can be configured such that the rotational orientation of the sleeve becomes fixed when the threaded protrusion of the fastening component is sufficiently tightened into the threaded opening of the separate mechanical asset. The sleeve wall(s) can define an outer surface that includes at least one pair of opposing flat regions.

In further detailed embodiments, the insert can be rigidly coupled to the sleeve within the sleeve opening such that the insert is laterally and rotationally fixed with respect to the sleeve, for example, such as where the insert is press fit within the sleeve. An internal thread of the threaded inner opening can have a rotational orientation arranged to match at least one exterior feature of the sleeve. In some arrangements, tightening the threaded portion of the separate mechanical component into the threaded inner opening of the insert to a specified torque value can result in achieving an exact rotational orientation of the separate mechanical component relative to an exterior feature of the sleeve. This tightening to the specified torque value while the mounting assembly is fastened to the separate mechanical asset can result in the exact rotational orientation corresponding to the specific rotational orientation of the separate mechanical component relative to the separate mechanical asset. The sleeve can include an upper surface configured to contact and provide a physical stop against a bottom surface of the separate mechanical component when the threaded portion of the separate mechanical component is inserted into and sufficiently rotated within the threaded inner opening, such as to a specific torque value. The insert can also have an upper surface arranged to be lower than or flush with the upper surface of the sleeve.

In further embodiments of the present disclosure, a mounting assembly configured to mount a separate mechanical component to a separate mechanical asset can include a fastening component, a sleeve, and an insert. The fastening component can include a threaded protrusion extending from a flange, the threaded protrusion defining a first diameter and the flange defining a second diameter that is greater than the first diameter. The threaded protrusion can be configured to be rotationally inserted into a threaded opening of the separate mechanical asset. The fastening component can also include a tightening feature at a top surface of the flange, the tightening feature configured to facilitate rotational tightening of the threaded protrusion into the threaded opening of the separate mechanical asset. The sleeve can have one or more walls coupled to an endcap at one end thereof to define an inner volume having a sleeve opening at another end opposite the endcap. The inner volume can be configured to hold the flange therein such that the flange is rotatable within the inner volume. The endcap can include an endcap opening configured to allow the threaded protrusion to pass therethrough while the flange remains within the inner volume. The insert can be fitted within the sleeve opening such that the insert is unable to move relative to the sleeve and the flange is fully constrained within the inner volume. The insert can include a threaded inner opening configured to accept a rotational insertion therein of a threaded portion of the separate mechanical component such that the separate mechanical component is mounted to the separate mechanical asset at a specific rotational orientation relative to the separate mechanical asset. The tightening feature of the fastening component can be configured to be accessed via the threaded inner opening of the insert while the flange is fully constrained within the inner volume of the sleeve.

In various detailed embodiments, the specific rotational orientation of the separate mechanical component can be achieved automatically when the separate mechanical component is tightened into threaded inner opening at a designated preset torque value. Each of the fastening component, the sleeve, and the insert can define its own central longitudinal axis, and each of these central longitudinal axes can align with each other and can be configured to align with central longitudinal axes of the threaded opening of the separate mechanical asset and the threaded portion of the separate mechanical component when the mounting assembly mounts the separate mechanical component to the separate mechanical asset. In some arrangements, the mounting assembly can be configured such that all threads of the threaded portion of the separate mechanical component, the threaded inner opening of the insert, the threaded protrusion of the fastening component, and the threaded opening of the separate mechanical asset are unexposed to ambient environment when the mounting assembly mounts the separate mechanical component to the separate mechanical asset. The separate mechanical asset can be an industrial engine and the separate mechanical component is a vibration sensor.

In still further embodiments of the present disclosure, various methods of mounting a separate mechanical component to a separate mechanical asset using a mounting assembly are provided. Pertinent process steps can include coupling the mounting assembly to the separate mechanical asset, setting a rotational orientation of a mounting assembly sleeve, tightening the mounting assembly to the separate mechanical asset, and coupling the separate mechanical component to the mounting assembly. The mounting assembly can have a fastening component, a sleeve, and an insert. Coupling the mounting assembly to the separate mechanical asset can include inserting a threaded protrusion of the fastening component into a threaded opening of the separate mechanical asset. Setting the rotational orientation of the sleeve with respect to the separate mechanical asset can be done while a flange of the fastening component remains within an inner volume of the sleeve and the threaded protrusion extends away from the sleeve and into the threaded opening of the separate mechanical asset. Tightening the fastening component can be done into the threaded opening of the separate mechanical asset until the sleeve cannot freely rotate with respect to the fastening component or to the separate mechanical asset. Coupling the separate mechanical component to the mounting assembly can involve rotatably inserting a threaded portion of the separate mechanical component into a threaded inner opening of the insert while the insert is fitted within the inner volume such that the separate mechanical component is coupled to the separate mechanical asset at a specific rotational orientation relative to the separate mechanical asset. In various detailed embodiments, further process steps can include creating the mounting assembly, forming the threaded opening within the separate mechanical asset, tightening the separate mechanical component into the insert to a proper torque, and confirming that the specific rotational orientation is a proper relative rotation of the separate mechanical component to the separate mechanical asset.

Other apparatuses, methods, features, and advantages of the disclosure will be or will become apparent to one with skill in the art upon examination of the following figures and detailed description. It is intended that all such additional apparatuses, methods, features and advantages be included within this description, be within the scope of the disclosure, and be protected by the accompanying claims.

BRIEF DESCRIPTION OF THE DRAWINGS

The included drawings are for illustrative purposes and serve only to provide examples of possible structures, arrangements, devices, systems, and methods of use for self-aligning threaded mounting assemblies. These drawings in no way limit any changes in form and detail that may be made to the disclosure by one skilled in the art without departing from the spirit and scope of the disclosure.

FIG. 5 illustrates a flowchart of an example detailed method of mounting a mechanical component to a mechanical asset using a mounting assembly according to one embodiment of the present disclosure.

DETAILED DESCRIPTION

Figure 1A:
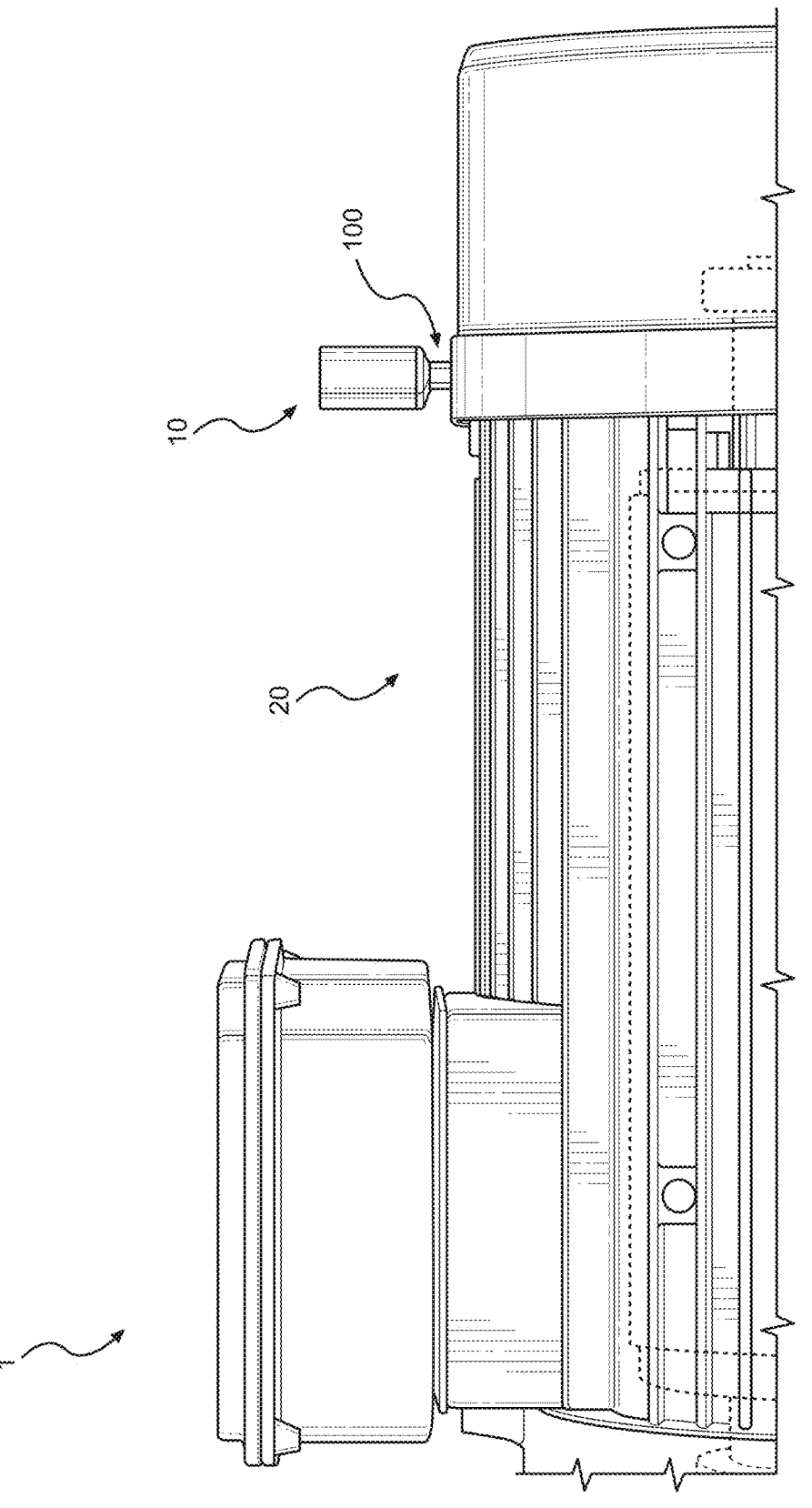
FIG. 1A illustrates in side elevation view an environment with a mechanical component coupled to a mechanical asset using an example mounting assembly according to one embodiment of the present disclosure.

Exemplary applications of apparatuses, systems, and methods according to the present disclosure are described in this section. These examples are being provided solely to add context and aid in the understanding of the disclosure. It will thus be apparent to one skilled in the art that the present disclosure may be practiced without some or all of these specific details provided herein. In some instances, well known process steps have not been described in detail in order to avoid unnecessarily obscuring the present disclosure. Other applications are possible, such that the following examples should not be taken as limiting. In the following detailed description, references are made to the accompanying drawings, which form a part of the description and in which are shown, by way of illustration, specific embodiments of the present disclosure. Although these embodiments are described in sufficient detail to enable one skilled in the art to practice the disclosure, it is understood that these examples are not limiting, such that other embodiments may be used, and changes may be made without departing from the spirit and scope of the disclosure.

The present disclosure relates in various embodiments to features, apparatuses, systems, and methods involving mounting assemblies. In particular, this can include mounting assemblies configured to mount a separate mechanical component to a separate mechanical asset in a manner that provides for specific rotational alignments for the coupled items. In specific arrangements, the mechanical component can be an industrial sensor, such as a vibration sensor, while the mechanical asset can be industrial mechanical equipment, such as an industrial motor.

As will be readily appreciated by those of skill in the art, the use of some industrial sensors can depend heavily on a sensor being installed properly with respect to its monitored or tracked industrial equipment item or other asset. Proper installation of a sensor can involve the correct placement, mounting, fixture stiffness, and rotational alignment with respect to its tracked item. As one example, many types of standard vibration sensors operate accurately when they are mounted directly to an industrial equipment item that they are monitoring, with such mounting being at an optimal location on the item as well as an optimal relative rotational orientation with respect to the item being monitored for vibration.

The disclosed embodiments involve improved threaded coupling arrangements for self-aligning mounting assemblies, which can include mechanical arrangements having threaded mating components, integrated axis retention during rotational coupling, minimally exposed threaded portions, and adhesive-free interference fits, among other advantageous features. In particular, the disclosed mounting assemblies can include mechanically interlocking fastening components, sleeves, and inserts that facilitate the ready fastening of a mechanical component to a mechanical asset at a specific rotational alignment in a simple and streamlined manner.

Although various embodiments disclosed herein discuss the specific application of mounting a vibration sensor to an industrial motor, it will be readily appreciated that the disclosed features, apparatuses, systems, and methods for mounting assemblies can also be used in other applications and environments where mounting a separate mechanical component to a separate mechanical asset is desired. Furthermore, while some examples are provided for specific tools, components, and materials, it will be understood that these can be replaced with any suitable substitute or alternative tools, components, and/or materials that take advantage of the disclosed features. Other applications, arrangements, and extrapolations beyond the illustrated embodiments are also contemplated.

Referring first to FIG. 1A, an environment with a mechanical component coupled to a mechanical asset using an example mounting assembly is illustrated in side elevation view. Industrial environment 1 can include a relatively smaller mechanical component 10 that is mounted to a relatively larger mechanical asset 20 by way of a mounting assembly 100. In various arrangements, mechanical component 10 can be a sensor, such as a vibration sensor, for example. Other types of sensors are also possible, such as, temperature, current, pressure, and moisture sensors, with other types of mechanical components suitable for mounting also being possible. In various arrangements, mechanical asset 20 can be a manufacturing or industrial item, such as an industrial motor, although other types of mechanical assets are also possible.

As is generally well known, there are many different ways to mount separate components within an industrial setting or environment, and some mounting techniques involve controlling for a specific or precise rotational orientation of mounted components. Such a specific rotational orientation can be desirable where mechanical component 10 is a vibration sensor that is mounted to a larger vibrating mechanical asset 20, such as an industrial motor, for example. Mounting assembly 100 can be configured to mount mechanical component 10 to mechanical asset 20 in a manner that results in a specific rotational orientation of mechanical component 10 with respect to mechanical asset 20. Mounting assembly 100 can be designed to facilitate such a rotationally precise mounting in a convenient and streamlined manner based on its interlocking component arrangement, as set forth in greater detail below.

Figure 1B:
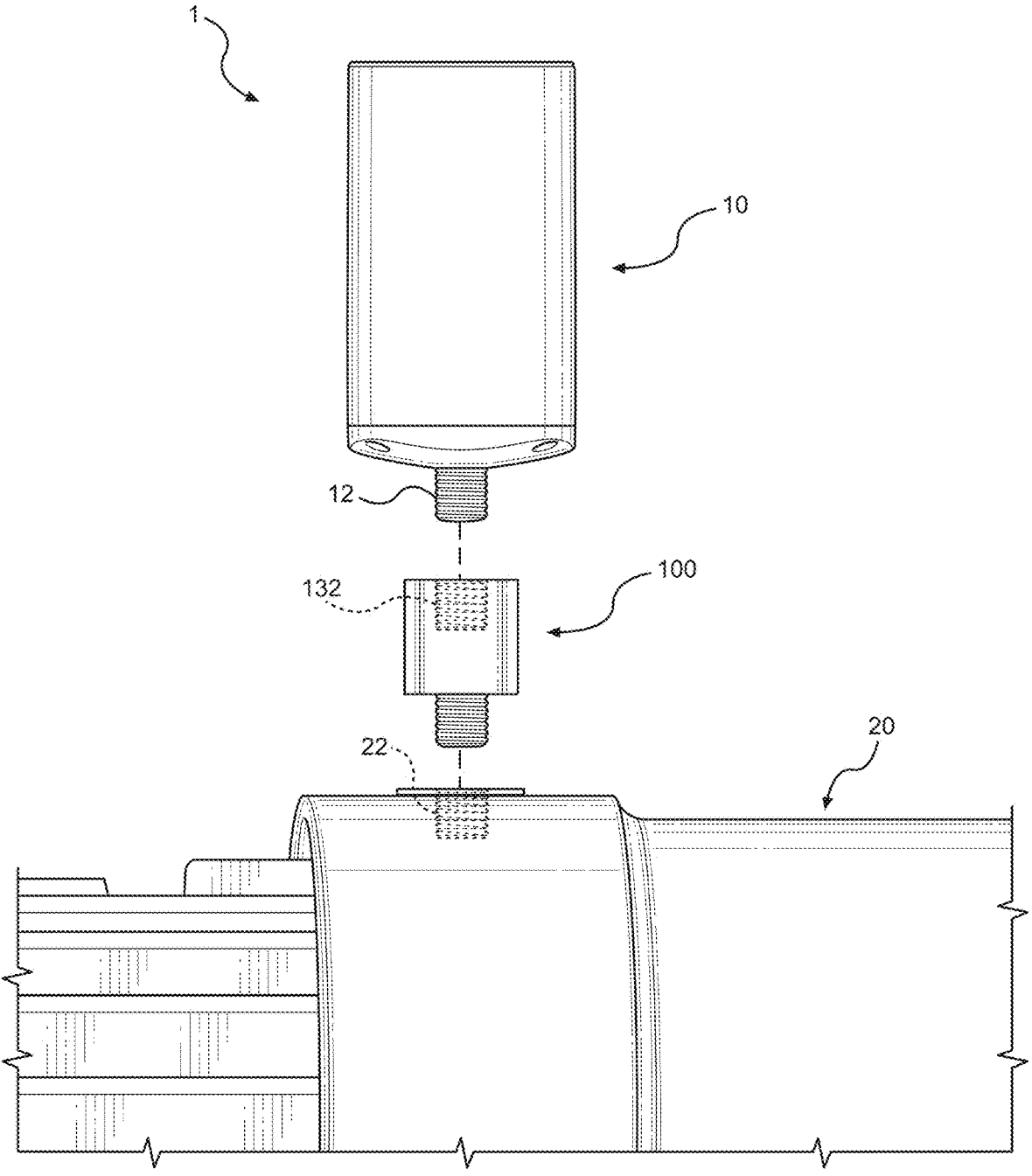
FIG. 1B illustrates in side exploded close-up view the environment of FIG. 1A with the mechanical component, mechanical asset, and example mounting assembly all uncoupled according to one embodiment of the present disclosure.

FIG. 1B illustrates in side exploded close-up view the environment of FIG. 1A with the mechanical component, mechanical asset, and example mounting assembly all uncoupled from each other. In some arrangements, mechanical component 10 and mechanical asset 20 can be separate items that are already available with a desire to mount, attach, or otherwise couple the mechanical component to the mechanical asset, such as by way of using mounting assembly 100. Mechanical component 10 can be relatively smaller compared with mechanical asset 20 such that coupling these items together can involve moving and mounting a vibration sensor or other smaller portable mechanical component along with mounting assembly 100 onto an industrial motor or other larger stationary mechanical asset.

In various embodiments, mounting assembly 100 can be attached or coupled in one or more ways to both mechanical component 10 and mechanical asset 20, and this can involve one or more features on each of these items. Mechanical component 10 can have a threaded post or portion 12 extending outward from a bottom region thereof, which can be standard or readily available features on the mechanical component. For example, many vibration sensors can have a built-in threaded post designed for mounting or coupling the sensor to another item. Mounting assembly 100 can have a threaded inner opening 132 configured to receive threaded portion 12 of mechanical component 10 to facilitate directly attaching or otherwise coupling these two items, such as by rotational insertion of threaded portion 12 into threaded inner opening 132. Mounting assembly 100 can also have a threaded protrusion 112 extending outward therefrom, which can be configured to be rotationally inserted into a threaded opening 22 located on mechanical asset 20. In some arrangements, these threaded attachment features can be designed for ready direct attachment and removal of these items with respect to each other. Further descriptions for each of these items and features are provided in greater detail below.

Figure 2:
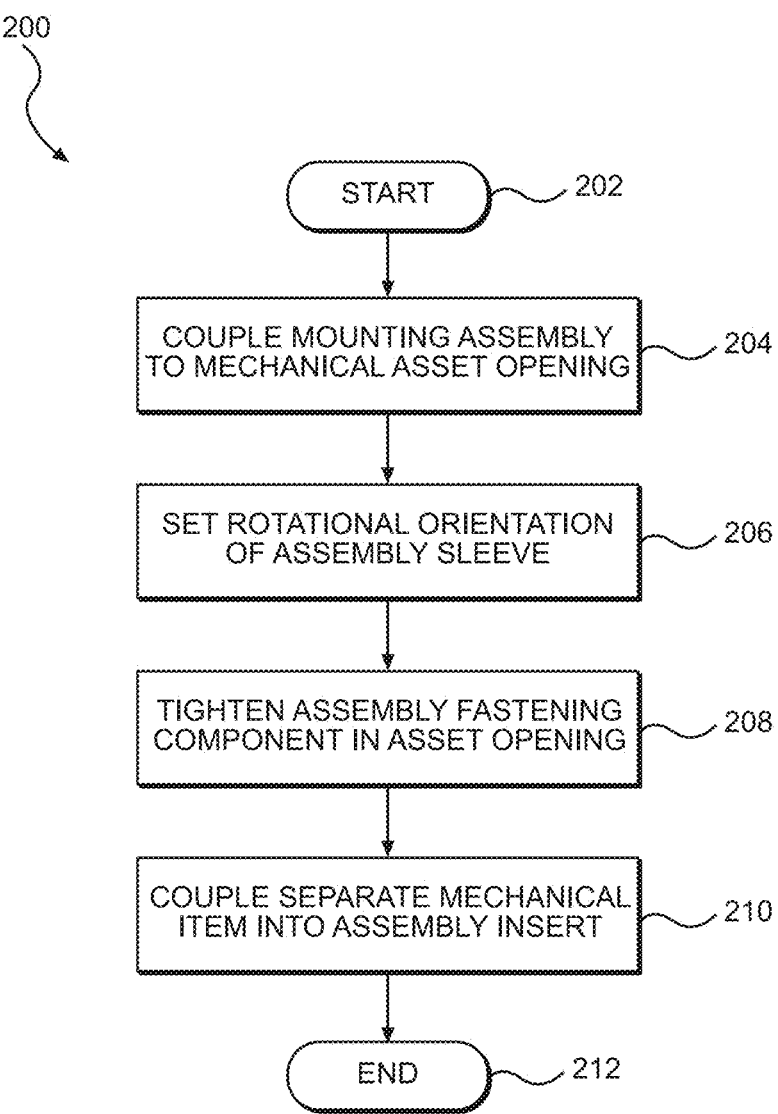
FIG. 2 illustrates a flowchart of an example summary method of mounting a mechanical component to a mechanical asset using a mounting assembly according to one embodiment of the present disclosure.

Moving next to FIG. 2, a flowchart is provided of an example summary method of mounting a mechanical component to a mechanical asset using a mounting assembly. Summary method 200 can represent one broad aspect of various overall methods of mounting a mechanical component to a mechanical asset, and it will be understood that various other steps and details of such a broad aspect and overall methods are not provided here for purposes of simplicity. While summary method 200 and other disclosed methods can involve mounting a vibration sensor to an industrial motor, for example, it is also contemplated that the various disclosed methods can alternatively be applied to other types of mechanical components and mechanical assets.

After a start step 202, a first process step 204 can involve coupling the mounting assembly to the mechanical asset. This can involve coupling the mounting assembly to a threaded opening within the mechanical asset, such as by inserting a threaded protrusion of the mounting assembly into the threaded opening of the mechanical asset. In some embodiments, the mounting assembly can include a fastening component with the threaded protrusion, a sleeve, and an insert, various arrangements for which are provided in greater detail below.

At a following process step 206, a rotational orientation of the mounting assembly can be set with respect to the mechanical asset. This can involve setting a rotational orientation of a mounting assembly sleeve with respect to the mechanical asset. In some arrangements, this can be done while a flange of the mounting assembly fastening component remains within an inner volume of the sleeve and the mounting assembly threaded protrusion extends away from the sleeve and into the threaded opening of the mechanical asset.

At the next process step 208, the mounting assembly can be tightened against the mechanical asset. This can involve tightening the mounting assembly fastening component into the threaded opening of the mechanical asset until the mounting assembly sleeve cannot freely rotate with respect to the fastening component or to the mechanical asset. In some arrangements, this can be done while the mounting assembly sleeve remains at the set rotational orientation.

Subsequent process step 210 can involve coupling the mechanical component to the mounting assembly. This can be done, for example, by rotatably inserting a threaded portion of the mechanical component into a threaded inner opening of the mounting assembly insert while the insert is fitted within the mounting assembly sleeve inner volume such that the mechanical component is coupled to the mechanical asset at a specific rotational orientation relative to the mechanical asset.

Summary method 200 can then end at end step 212. As noted above, the mechanical component and mechanical asset can be separate items from each other and also from the mounting assembly, which can be used to mount one of these separate items to the other. In some arrangements, one or more of the foregoing steps can be performed simultaneously or in a different order. For example, steps 206 and 208 can be performed simultaneously in some arrangements. Not all steps are necessary in all situations, and additional steps and details can be added. Further steps, details, and variations are provided in detailed method 500 set forth below.

Figure 3A:
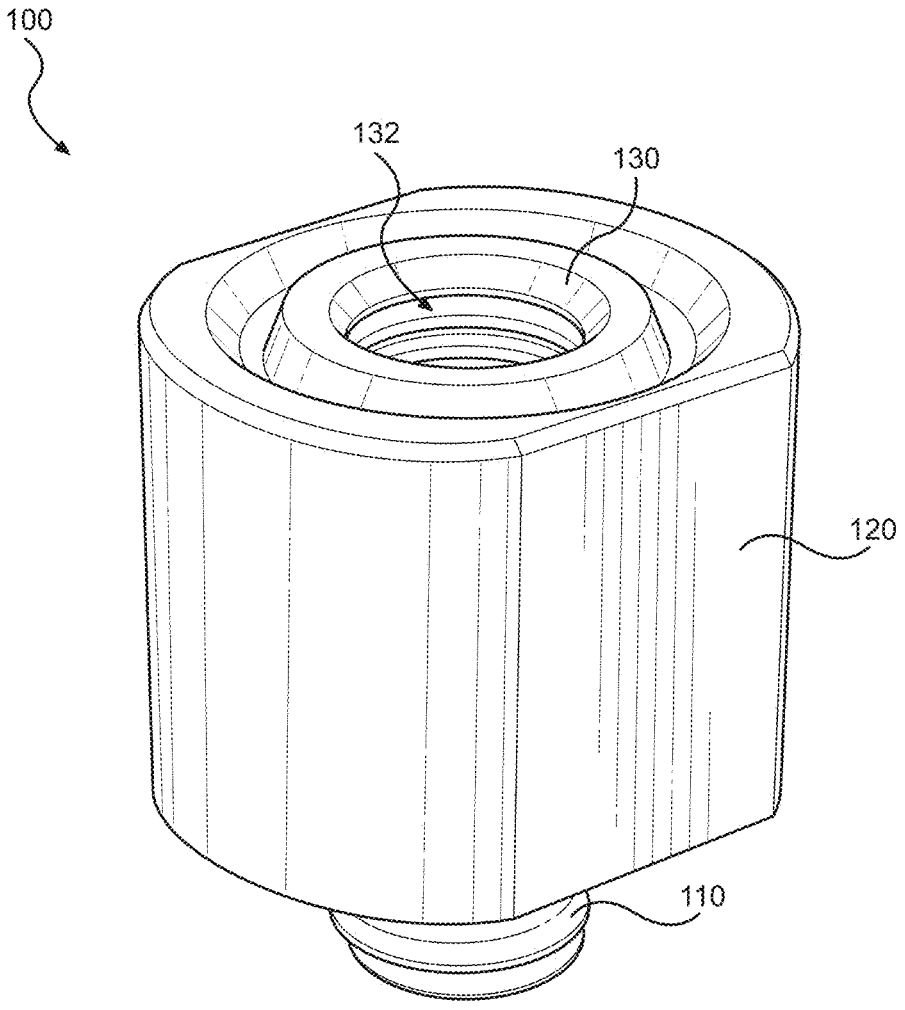
FIG. 3A illustrates in top perspective view an example mounting assembly according to one embodiment of the present disclosure.
Figure 3B:
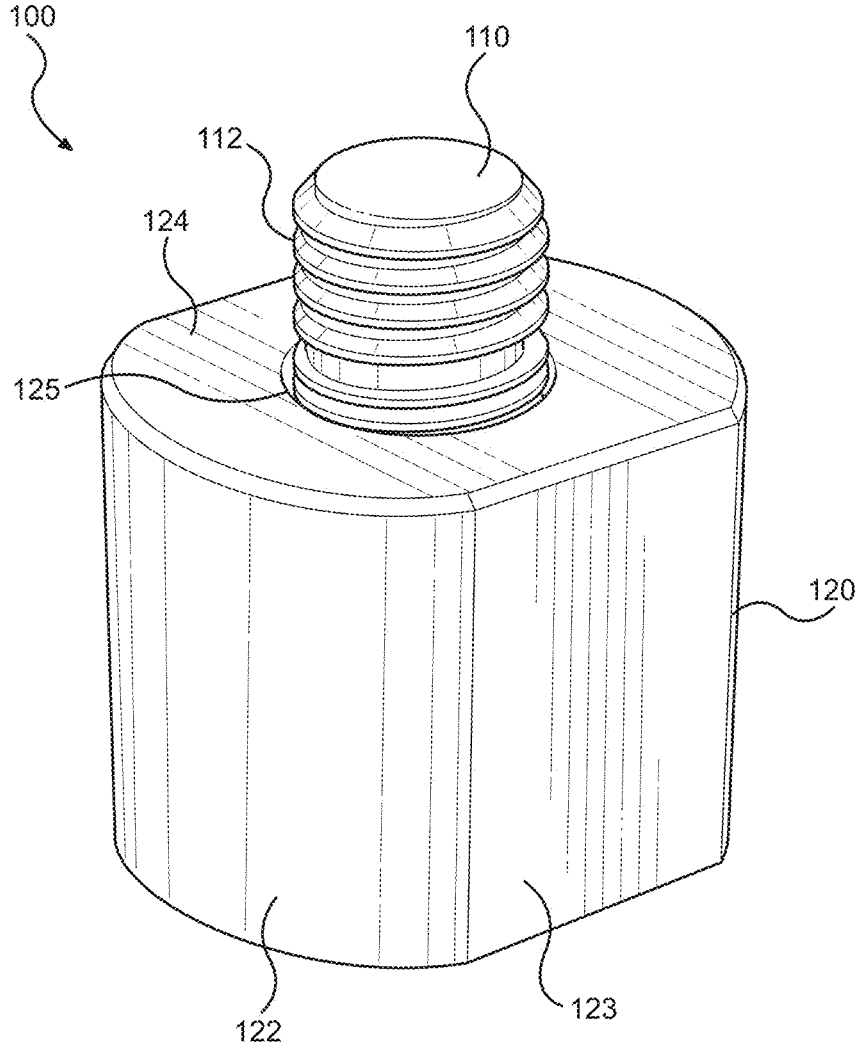
FIG. 3B illustrates in bottom perspective view the mounting assembly of FIG. 3A according to one embodiment of the present disclosure.
Figure 3C:
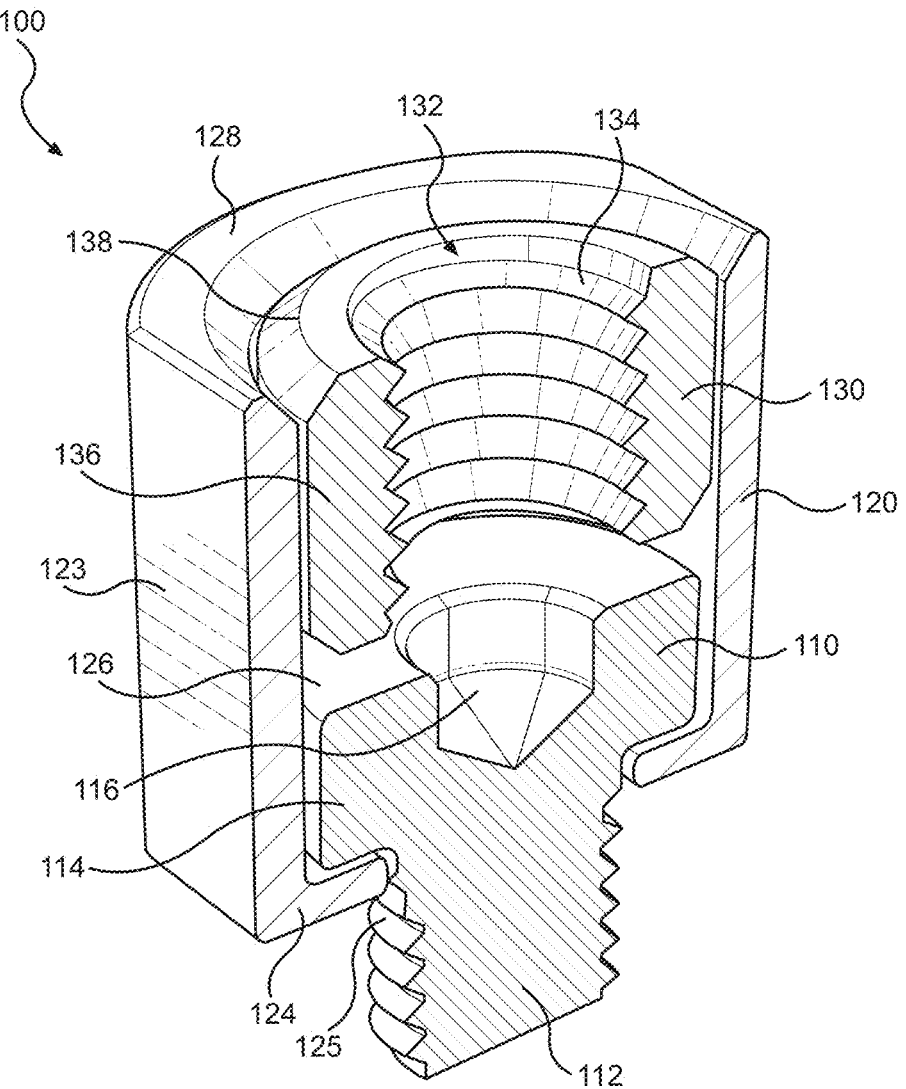
FIG. 3C illustrates in side perspective cross-section view the mounting assembly of FIG. 3A according to one embodiment of the present disclosure.

Continuing with FIGS. 3A-3C, an example mounting assembly is illustrated in top perspective, bottom perspective, and side perspective cross-section views respectively. As noted above, mounting assembly 100 can be configured to mount or otherwise couple a separate mechanical component to a separate mechanical asset, such as a vibration sensor to an industrial motor. Mounting assembly 100 can include three combined items: a fastening component 110, a sleeve 120, and an insert 130. In some arrangements, these three items 110, 120, 130 can mechanically interlock to form a mounting assembly 100 that is configured to facilitate the ready mounting or fastening of the mechanical component to the mechanical asset at a specific rotational alignment in a simple and streamlined manner. In some arrangements, these three items 110, 120, 130 interlock such that they are not readily disassembled from each other.

Fastening component 110 can include a threaded protrusion 112 extending away from a flange 114, and a tightening feature 116 located at a top surface of the flange, among other possible features. In some arrangements, fastening component 110 and all of its features can be integrally formed from any suitable material, such as stainless steel, for example. Threaded protrusion 112, which can be seen in FIGS. 1B, 3A, 3B, and 3C, can define a longitudinal axis and a first diameter, and can be configured to be rotationally inserted into a threaded opening of a separate mechanical asset. Threaded protrusion 112 can thus be used to mount or fasten mounting assembly 100 into a threaded opening on a separate mechanical asset, as noted above.

As shown in FIG. 3C, flange 114 can be held within sleeve 120 while threaded protrusion 112 extends away from the sleeve. Flange 114 can define a second diameter that is greater than the first diameter (of threaded protrusion 112), such that the flange portion of fastening component 110 cannot escape from inside sleeve 120 through sleeve opening 125 or threaded inner opening 132 of insert 130. Tightening feature 116 can be configured to facilitate rotational tightening of threaded protrusion 112 into a threaded opening of a separate mechanical asset, such as by rotating fastening component 110 at tightening feature such that the entire fastening component rotates as a combined item. Tightening feature 116 can be configured to be accessed via threaded inner opening 132 of insert 130 while flange 114 is fully constrained within inner volume 126 of sleeve 120. Tightening feature 116 can include one or more features configured for facilitating tightening by way of, for example, a hex key, screwdriver, socket wrench, or any other suitable torquing or tightening tool.

Sleeve 120 can include one or more walls 122 coupled to an endcap 124 at one end thereof to define inner volume 126, which can have an open end or "sleeve opening" at the end opposite the endcap, with a sleeve upper surface 128 surrounding the sleeve opening, among other possible features. In some arrangements, sleeve 120 and all of its features can be integrally formed from any suitable material, such as stainless steel, for example. A single fully or partially circular wall 122 can form around an outer circumference of sleeve 120, and the one or more walls of the sleeve can define an outer surface that includes at least one pair of opposing flat regions opposing flat regions 123. Such flat regions 123 can be sized and shaped to accommodate a standard size wrench or tool to facilitate a controlled rotation or held position for sleeve 120, as will be readily appreciated.

Endcap 124 can have an endcap opening 125 that can be sized and shaped to allow threaded post or protrusion 112 of fastening component 110 to pass therethrough while fastening component flange 114 remains within inner volume 126. One or both of flange 114 and inner volume 126 can be sized and shaped such that the flange is rotatable within the inner volume while remaining therein. As will be readily appreciated, this can allow sleeve 120 to remain stationary, such as at a set rotational position, while fastening component 110 rotates such that threaded protrusion 112 can be rotatably inserted into a threaded opening on a separate mechanical asset.

Insert 130 can include a threaded inner opening 132 having a thread 134, outer wall surface 136, and insert upper surface 138, among other possible features. Insert 130 and all of its features can be integrally formed from any suitable material, such as stainless steel, for example. As noted above, threaded inner opening 132 can be configured to accommodate a threaded portion of a separate mechanical component, such as that which is shown in FIG. 1B above. Insert 130 can be press fit, friction fitted, or otherwise placed as shown within the sleeve opening of sleeve 120 so that the insert is rigidly coupled to the sleeve within the sleeve opening in a manner such that the insert is laterally and rotationally fixed with respect to the sleeve. As such, outer wall surface 136 of insert 130 can be configured to form a press fit or other friction based fit with the inner surface of sleeve 120 within inner volume 126.

When fastening component 110 is already located with respect to sleeve 120, fitting insert 130 into the sleeve 120 can the result in flange 114 being fully constrained within inner volume 126 of the sleeve. When installed properly, threaded inner opening 132 can be aligned along the longitudinal axis of threaded protrusion 112 of fastening component 110, and can be configured to accept a rotational insertion therein of a threaded portion of a vibration sensor or other suitable separate mechanical component. Sleeve upper surface 128 of sleeve 120 can be arranged to be flush with or higher than insert upper surface 138 of insert 130. In other words, insert 130 can have an insert upper surface 138 that is set or arranged to be lower than or flush with sleeve upper surface 128 of sleeve 120. In some arrangements, one or both of these sleeve and insert upper surfaces 128, 138 can be configured to provide a hard stop against a bottom surface of a separate mechanical component being installed into mounting assembly 100, as detailed below. Proper insertion of the separate mechanical component can result in the separate mechanical component being coupled to the separate mechanical asset at a specific rotational orientation relative to the separate mechanical asset.

As shown in FIG. 3C, an interstitial clearance can exist between flange 114 of fastening component 110 and insert 130 to permit free movement of the fastening component with respect to the insert. Sufficient clearance can also exist between flange 114 and the inner surfaces of sleeve 120 about inner volume 126. This can allow for controlled angular rotation of fastening component 110 while flange 114 is inside inner volume 126 before a final torque is applied to the fastening component, which final torque can lock the fastening component in place against sleeve 120. Such freely available movement prior to applying a final torque can enable a precise rotational alignment of mounting assembly 100 with respect to a separate mechanical asset, which can then in turn enable a precise rotational alignment of a separate mechanical component to the separate mechanical asset using the mounting assembly. Such precise rotational alignments can be achieved independently of thread pitches, torque positions, and other features of the mechanical component, mounting assembly, and mechanical asset.

In some embodiments, one or more of the component threads can be designed and/or oriented in such a manner to facilitate the precise final rotational orientation of the separate mechanical component with respect to the separate mechanical asset. For example, thread 134 of threaded inner opening 132 can be oriented such that a simple rotational insertion and torquing of a separate mechanical component threaded post results in the desired rotational orientation of the separate mechanical component with respect to the separate mechanical asset. This can be accomplished when insert 130 is press fit or otherwise affixed inside of sleeve 120, which can be done with thread 134 at a desired proper orientation with respect to flat regions 123 around the outside of the sleeve. When sleeve 120 is then set at a desired rotational orientation with respect to the separate mechanical asset by using flat regions 123, thread 134 will be properly oriented such that insertion and installation of the separate mechanical component results in the desired precise rotational orientation of the mechanical component with respect to the mechanical asset.

In various embodiments, as noted above, installation of mechanical component 10 to mounting assembly 100 can involve a bottom surface of the mechanical component contacting and torquing against sleeve upper surface 128 of the mounting assembly. Due to the size, shape, and geometry of sleeve 120, this can sometimes result in just an "outer ring" of contact between mechanical component 10 and mounting assembly 100. As may be appreciated by those of skill in the art, increased mounting and fixture stiffness in the installed arrangement can be realized when the mechanical component contacts and is torqued only or primarily against sleeve upper surface 128, due to the relatively larger diameter of sleeve 120 and the geometrical nature of the various mounting assembly components. As will also be appreciated, increased mounting or fixture stiffness can ensure that an installed vibration sensor or other mechanical component can operate and respond robustly as designed within the overall arrangement. For example, ensuring that an installed vibration sensor contacts sleeve 120 directly can establish a more reliable mechanical link between the sensor, the mounting assembly, and ultimately the mechanical asset, which can then result in more consistent vibration transmission from asset to sensor.

Accordingly, insert 130 can be positioned somewhat lower within sleeve 120 such that its insert upper surface 138 is at a level that is below the level of sleeve upper surface 128, such as during formation of mounting assembly 100. In various arrangements, this can mean that mechanical component 10 never contacts insert upper surface 138. In other arrangements, contact and torque from the bottom surface of mechanical component 10 can also occur against insert upper surface 138 of insert 130, such as where the insert upper surface 138 is at or becomes flush with the sleeve upper surface 128. In the event that sleeve upper surface 128 is at a somewhat higher level than insert upper surface 138, for example, it may be possible in some situations that torquing mechanical component 10 into mounting assembly 110 can result in the bottom surface of the mechanical component initially contacting and torquing only against the sleeve upper surface but then contacting and torquing against both sleeve and insert upper surfaces before torquing is completed.

As noted above, insert 130 can be press fit, friction fit, or otherwise affixed inside of sleeve 120 such that these components are firmly affixed with respect to each other. This can result in no lateral movement or rotational displacement of insert 130 within sleeve 120. In some arrangements, this can involve a sufficiently strong press or friction fit such that no welding, glue, or other adhesives are used. In other arrangements, a suitable glue, adhesive, and/or weld can be used to facilitate affixing insert 130 to sleeve 120. For example, insert 130 can be press or friction fit into sleeve 120, whereupon a ring weld can then be formed between the insert and sleeve along the upper juncture between them. As shown in FIG. 3C, such a ring weld (not shown) could be formed below both sleeve upper surface 128 and insert upper surface 138 due to the beveling along the upper regions of both sleeve 120 and insert 130. As will be readily appreciated, this can provide another reason as to why it may be preferable for sleeve upper surface 128 to be above or flush with insert upper surface 138, since initial contact and torque of the sensor or other mechanical component against only the insert upper surface may raise the risk of weld fatigue or other relative press fit stability of insert 130 within sleeve 120.

Figure 4A:
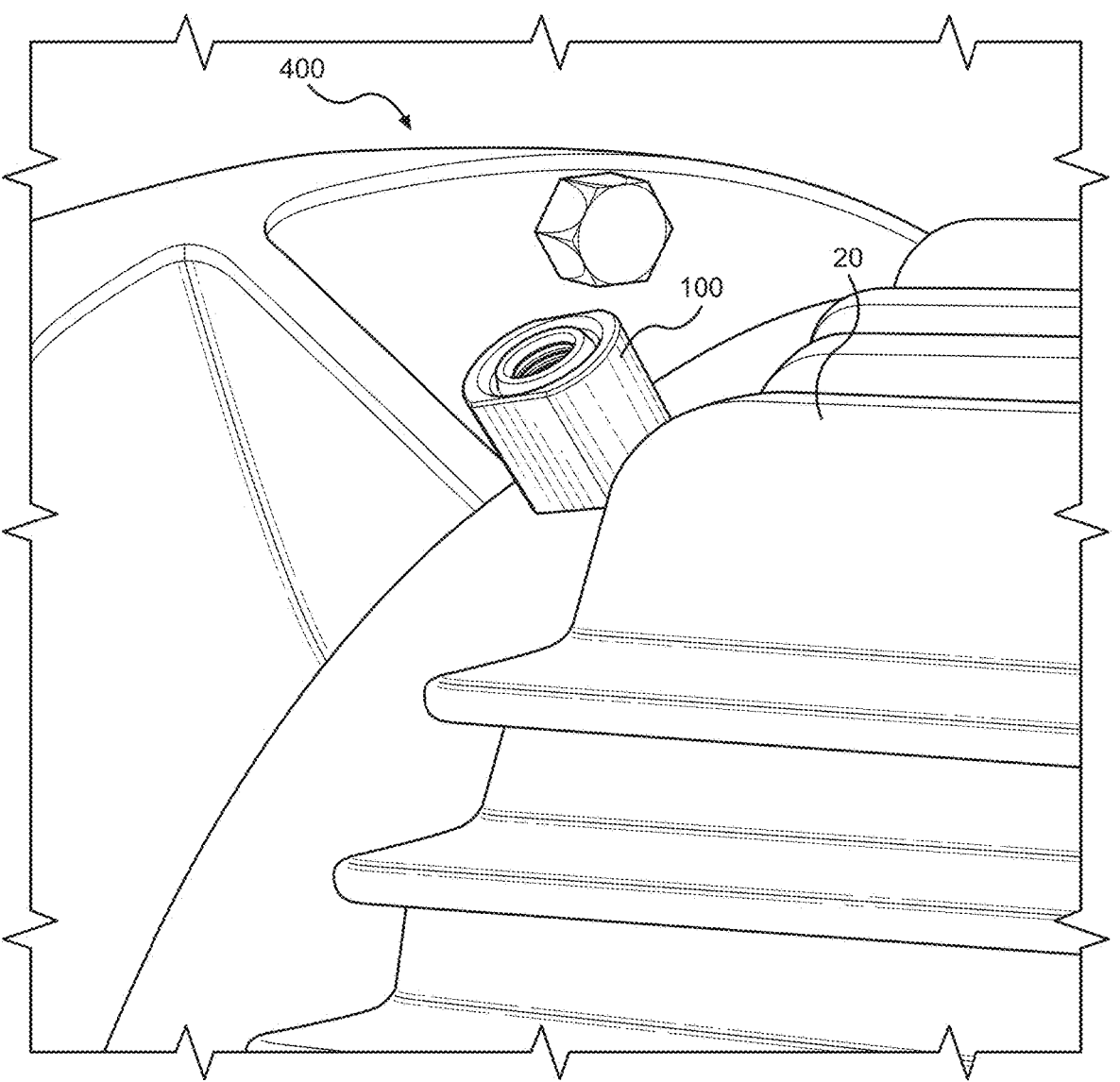
FIG. 4A illustrates in front perspective view an example mounting assembly coupled to a separate industrial motor according to one embodiment of the present disclosure.
Figure 4B:
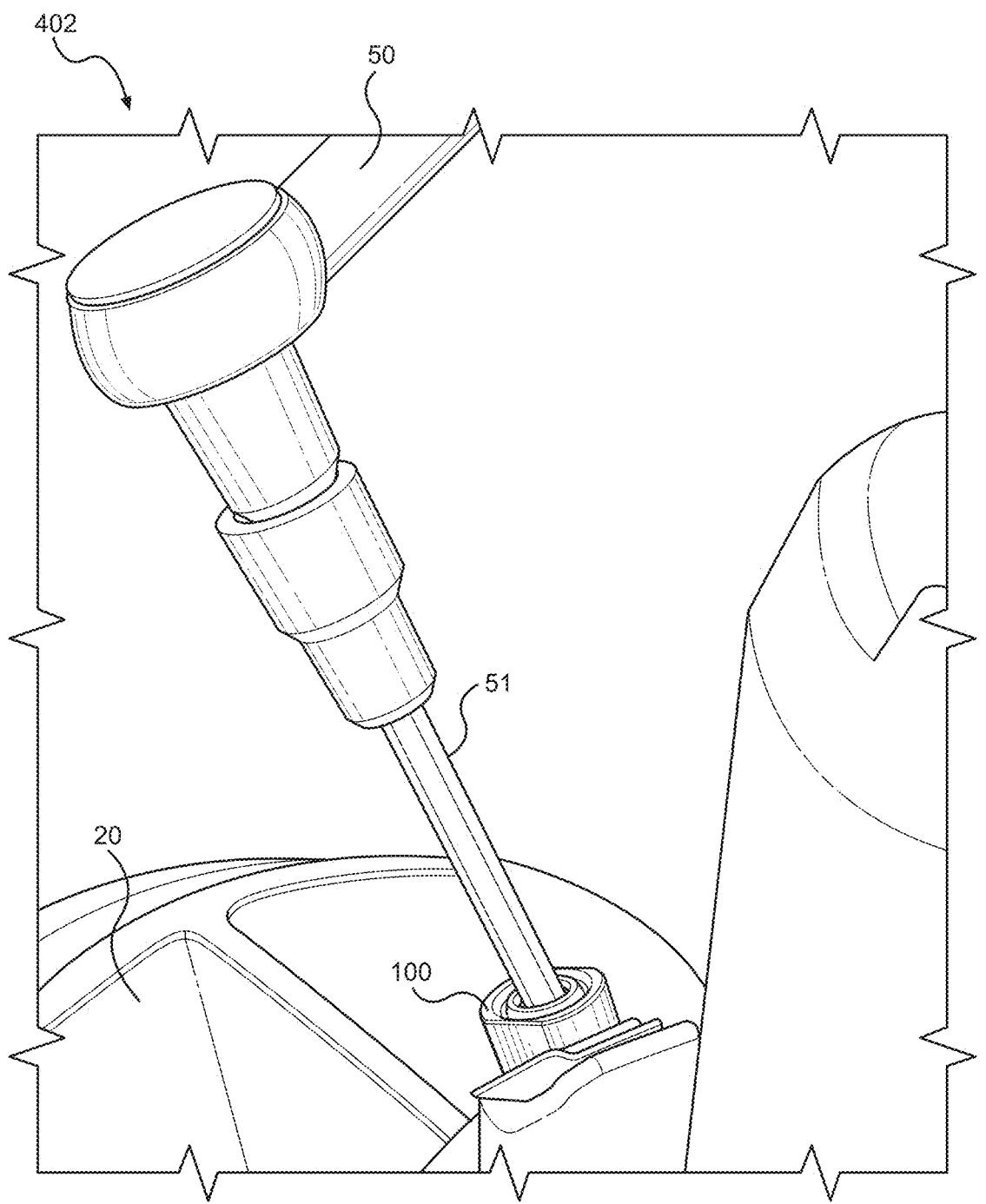
FIG. 4B illustrates in front perspective view an example step of tightening the example mounting assembly of FIG. 4A to the separate industrial motor according to one embodiment of the present disclosure.
Figure 4C:
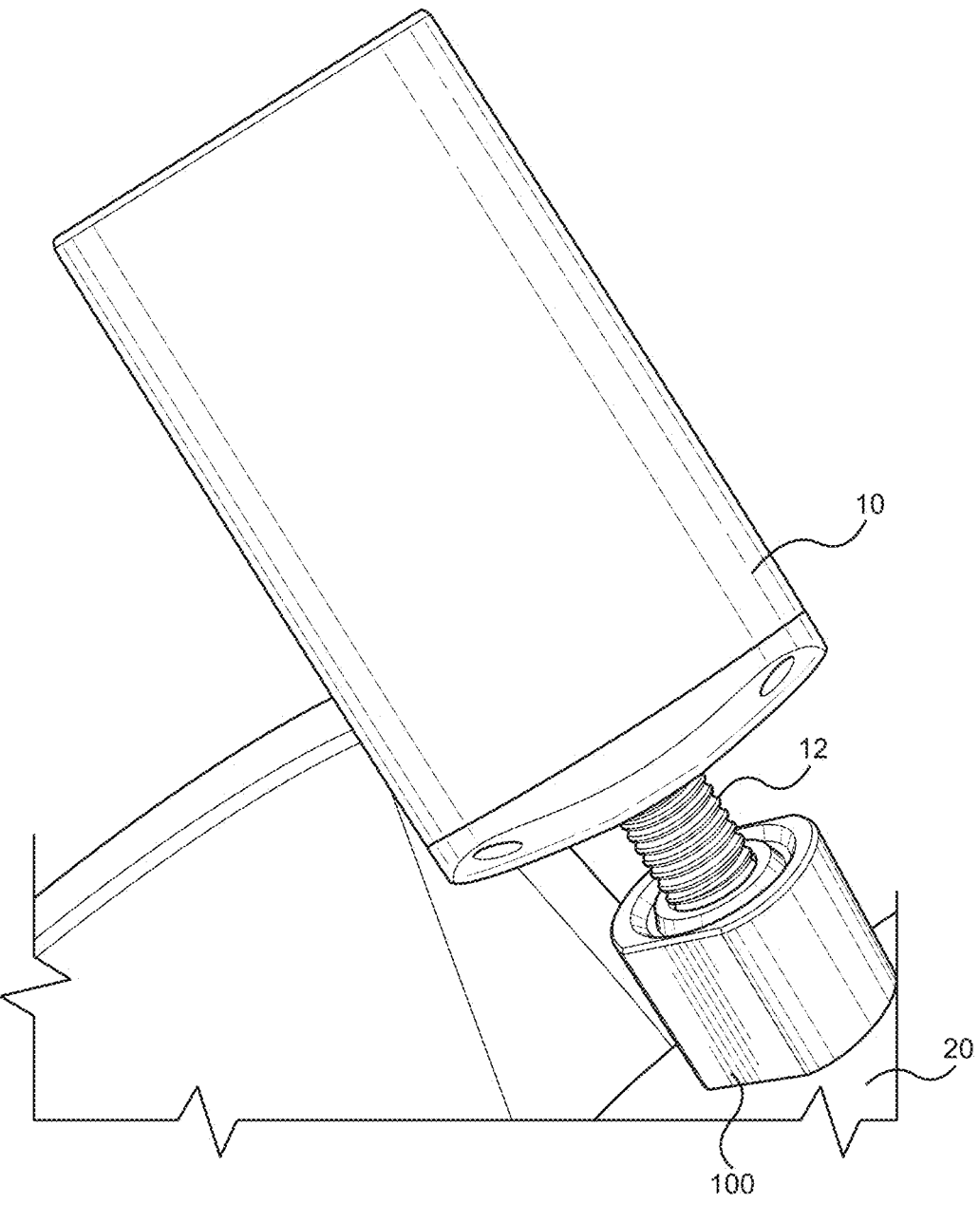
FIG. 4C illustrates in front perspective view an example step of coupling a separate vibration sensor to the example mounting assembly of FIG. 4A to mount the separate vibration sensor to the separate industrial motor using the mounting assembly according to one embodiment of the present disclosure.

FIGS. 4A through 4C illustrate in front perspective view various steps in the process of mounting a mechanical component to a mechanical asset using a mounting assembly as shown and described herein. FIG. 4A shows a mounting assembly coupled to an industrial motor, while FIG. 4B shows the step of tightening the mounting assembly to the industrial motor, and FIG. 4C shows the step of coupling a vibration sensor to the mounting assembly to result in mounting the vibration sensor to the industrial motor using the mounting assembly.

Configuration 400 of FIG. 4A reflects mounting assembly 100 being coupled to a separate mechanical asset 20, which can be an industrial motor, for example. Such a coupling can simply reflect a threaded protrusion of mounting assembly 100 being rotationally inserted into a threaded opening of separate mechanical asset 20. In some arrangements, the threaded opening can be created at an appropriate location on separate mechanical asset 20 to facilitate this rotational insertion as shown. As noted above, mounting assembly 100 can comprise three interlocking components that are readily operable as a combined unit. An operator or user can insert the threaded protrusion of mounting assembly 100 into the threaded opening and rotate the threaded protrusion until it begins to tighten inside the threaded opening.

Configuration 402 of FIG. 4B reflects the step of tightening mounting assembly 100 to the industrial motor or other separate mechanical asset 20. This can be done after a sleeve of mounting assembly 400 has been rotated to a desired rotational orientation. At that point, a box wrench or other suitable tool can be used to hold the sleeve in place, such as by placing the wrench or tool around flat regions of the sleeve. Torque wrench 50 can then be used to tighten a fastening component of mounting assembly 100. This can involve hex key 51 or another suitable screwdriving bit or extension that is coupled to torque wrench 50 being inserted through an insert of mounting assembly 100 to access a tightening feature on a top surface of a flange of the fastening component, as noted above. While holding the sleeve in place with the wrench, torque wrench 50 with hex key 51 can be used to tighten the fastening component of mounting assembly 100 into the threaded opening of separate mechanical asset 20 at a specifically desired torque or tightness.

This tightening can result in compressing components together to create a friction contact between the sleeve of mounting assembly 100 and an outer surface of separate mechanical asset 20 such that the sleeve is locked in place unable to rotate with respect to the mechanical asset. When the sleeve is properly positioned prior to torquing or tightening the fastening component, a desired angular or rotational orientation of the sleeve can be achieved without the use of adhesives. This locked rotational orientation can also by achieved without exposing threads on any component after the separate mechanical component is properly inserted into the threaded inner opening of mounting assembly 100.

Configuration 404 of FIG. 4C reflects the step of coupling a vibration sensor or other separate mechanical component 20 to mounting assembly 100. Such a coupling can produce a result of mounting separate mechanical component 10 (e.g., a vibration sensor) to separate mechanical asset 20 (e.g., an industrial motor) using mounting assembly 100. As shown, a threaded post or portion 12 of separate mechanical component 10 can be rotationally inserted into a threaded internal opening of mounting assembly 100. In some arrangements, threaded portion 12 can be rotationally fixed with respect to the rest of separate mechanical component 10 such that the entire mechanical component can be rotated or twisted to insert its threaded portion into the threaded internal opening. This can be done until a bottom surface of the vibration sensor or other separate mechanical component 10 contacts upper surface(s) of the mounting assembly 100, at which point the separate mechanical component can then be tightened to a suitable desired torque. As will be readily appreciated, this can involve the use of another box wrench or other suitable tool to tighten separate mechanical component 10 in place.

As shown and described in detail above, mounting assembly 100 generally provides improved threaded coupling arrangements that provide precise rotational alignments for coupled items, as well as various detailed technical benefits. For example, mounting assembly 100 can be scalable as desired for different applicational needs, and provides a single unit of interlocking mechanical parts that eliminates the need for multiple separate parts to be assembled on site. Mounting assembly 100 can be configured to maintain alignment of a separate mechanical component axis (e.g., vibration sensor threaded post axis) even during maintenance or partial disassembly of the separate mechanical component, separate mechanical asset, and/or mounting assembly. No adhesives are required, and no thread of any component is exposed after full mounting is completed. Field serviceability is also enhanced, as the separate mechanical component can be removed or replaced without disturbing the underlying mechanical assembly as already fastened to the separate mechanical asset. Manufacturing scalability is also enhanced, as the interference-fit design can simplify assembly and reduce dependency on the need for torque precision or additional locking features or components. Other advantages of disclosed mounting assembly 100 over existing mounting arrangements that provide for precise rotational orientations will be readily apparent to those of skill in the art.

Lastly, FIG. 5 illustrates a flowchart of an example detailed method of mounting a mechanical component to a mechanical asset using a mounting assembly. Detailed method 500 can represent one possible way of mounting a mechanical component to a mechanical asset, and it will be understood that various other steps, features, and details of such a detailed method are not provided here for purposes of simplicity. Detailed method 500 can include some or all steps and details of summary method 200 above, as will be readily appreciated. While detailed method 500 contemplates mounting a vibration sensor to an industrial motor, for example, it will be readily appreciated that other mechanical components and/or other mechanical assets can alternatively be used.

After a start step 502, a first optional process step 504 can involve creating a mounting assembly. This can involve creating mounting assembly 100 as illustrated and described above using three different interlocking components. For example, a separate fastening component 110 can be inserted into an inner volume of a separate sleeve 120 such that its flange remains within the inner volume while its threaded protrusion extends through an endcap opening of the sleeve. A separate insert 130 can then be press fit or otherwise inserted into the sleeve 120 such that the flange of the fastening component 110 is fully constrained therein but is able to rotate with respect to the sleeve. Process step 504 can be optional, such as in situations where a finished mounting assembly does not already exist.

At the next optional process step 506, a threaded opening can be formed in the separate mechanical asset. This can be done using a suitable drill or other threaded opening forming tool, and can be done at a suitable location on the mechanical asset. The threaded opening formed can be sized and shaped to coincide with the size and shape of a threaded protrusion or post on the mounting assembly. Process step 506 can be optional, such as in situations where a suitable threaded opening does not already exist in the mechanical asset.

At a following process step 508, a mounting assembly threaded protrusion can be inserted into a threaded opening of the mechanical asset. This can also be considered coupling the mounting assembly to the mechanical asset. Step 508 can be identical or substantially similar to step 204 above in some arrangements. Again, the mounting assembly can include a fastening component with the threaded protrusion, a sleeve, and an insert, various arrangements for which are provided in detail herein.

Subsequent process step 510 can involve setting a rotational orientation of the mounting assembly with respect to the mechanical asset. Step 510 can be identical or substantially similar to step 206 above in some arrangements. This can involve setting a rotational orientation of a mounting assembly sleeve with respect to the mechanical asset, which can be done while a flange of the mounting assembly fastening component remains within an inner volume of the sleeve and the mounting assembly threaded protrusion extends away from the sleeve and into the threaded opening of the mechanical asset.

At the next process step 512, the fastening post (i.e., threaded protrusion) of the mounting assembly can be tightened into the mechanical asset threaded opening. Step 512 can be identical or substantially similar to step 208 above in some arrangements. Again, this can involve tightening the fastening post into the threaded opening until the mounting assembly sleeve cannot freely rotate with respect to the fastening component or to the mechanical asset. This can be done while the mounting assembly sleeve remains at the set rotational orientation.

At following process step 514, a threaded portion or post of the separate mechanical component or item can be inserted into an insert of the mounting assembly. Step 514 can be identical or substantially similar to step 210 above in some arrangements. This can involve rotatably inserting a threaded portion of the mechanical component into a threaded inner opening of the mounting assembly insert while the insert is fitted within the mounting assembly sleeve inner volume.

Process step 516 can involve tightening the separate mechanical component or item into the mounting assembly to a proper torque value. As noted above, this can be done using a box wrench or other suitable tool to rotate the vibration sensor or other mechanical component such that its threaded portion rotates into the threaded inner opening of the mounting assembly to the proper torque amount. This can result in a bottom surface of the mechanical component contacting one or more upper surfaces of the mounting arrangement, such as upper surfaces at one or both of a sleeve and insert of the mounting arrangement. Tightening to the proper torque amount can result in coupling the mechanical component to the mechanical asset at a specific rotational orientation relative to the mechanical asset.

The next process step 518 can involve confirming a proper relative rotational orientation of the separate mechanical component with respect to the separate mechanical asset. This can involve visually inspecting both items to ensure that the vibration sensor or other separate mechanical component is properly oriented as desired with respect to the industrial motor or other separate mechanical asset. Automated sensing or detection components can be used to measure such a rotational orientation if desired. In the event that a proper relative rotational orientation has not been achieved, then the separate mechanical component and/or the mounting assembly can be loosened and various steps can be repeated as may be necessary, as will be readily appreciated by those of skill in the art.

The method can then end at step 520. For foregoing detailed method 500, it will be appreciated that not all process steps are necessary, and that other process steps may be added in some arrangements. For example, steps 504 and 506 are unnecessary where a fully assembled mounting assembly and a suitable threaded opening in the mechanical asset already exist. Steps can also be performed in different orders where practical, and some steps can be performed simultaneously. For example, steps 508 and 510 can be performed at the same time. Although known process steps are provided for the various techniques in detailed method 500, it will be appreciated that other similar methods for mounting a mechanical component to a mechanical asset using a mounting assembly are also possible.

Although the foregoing disclosure has been described in detail by way of illustration and example for purposes of clarity and understanding, it will be recognized that the above described disclosure may be embodied in numerous other specific variations and embodiments without departing from the spirit or essential characteristics of the disclosure. Certain changes and modifications may be practiced, and it is understood that the disclosure is not to be limited by the foregoing details but rather is to be defined by the scope of the appended claims.

What is claimed is:

1. A mounting system, comprising:

a sensor having a sensor protrusion with a threaded portion configured to facilitate mounting the sensor to a separate mechanical asset that is larger than the sensor; and a mounting assembly configured to be coupled to the sensor, the mounting assembly including:

a fastening component including a threaded protrusion extending from a flange, the threaded protrusion defining a longitudinal axis and a first diameter and the flange defining a second diameter that is greater than the first diameter, wherein the threaded protrusion is configured to be rotationally inserted into a threaded opening of the separate mechanical asset;

a sleeve having one or more walls coupled to an endcap at one end thereof to define an inner volume having a sleeve opening at another end opposite the endcap, the inner volume being configured to hold the flange therein such that the flange is rotatable within the inner volume, wherein the endcap includes an endcap opening configured to allow the threaded protrusion to pass therethrough while the flange remains within the inner volume; and an insert fitted within the sleeve opening such that the flange is fully constrained within the inner volume, the insert including a threaded inner opening aligned along the longitudinal axis of the fastening component threaded protrusion and configured to accept a rotational insertion therein of the sensor protrusion threaded portion while the sensor is located outside the sleeve such that the sensor is configured to couple to the separate mechanical asset at a specific rotational orientation relative to the separate mechanical asset.

2. The mounting system of claim 1, wherein the sensor is a vibration sensor.

3. The mounting system of claim 1, wherein the fastening component includes a tightening feature at a top surface of the flange, the tightening feature configured to facilitate rotational tightening of the threaded protrusion into the threaded opening of the separate mechanical asset.

4. The mounting system of claim 3, wherein the tightening feature is configured to be accessed via the threaded inner opening of the insert while the flange is fully constrained within the inner volume of the sleeve.

5. The mounting system of claim 1, wherein the fastening component and the sleeve are configured such that the rotational orientation of the sleeve becomes fixed when the threaded protrusion of the fastening component is sufficiently tightened into the threaded opening of the separate mechanical asset.

6. The mounting system of claim 1, wherein the one or more walls of the sleeve define an outer surface that includes at least one pair of opposing flat regions.

7. The mounting system of claim 1, wherein the insert is rigidly coupled to the sleeve within the sleeve opening such that the insert is laterally and rotationally fixed with respect to the sleeve.

8. The mounting system of claim 7, wherein the insert is press fit within the sleeve.

9. The mounting system of claim 1, wherein an internal thread of the threaded inner opening has a rotational orientation arranged to match at least one exterior feature of the sleeve.

10. The mounting system of claim 9, wherein tightening the threaded portion of the sensor protrusion into the threaded inner opening of the insert to a specified torque value results in achieving an exact rotational orientation of the sensor relative to an exterior feature of the sleeve.

11. The mounting system of claim 10, wherein tightening the threaded portion of the sensor protrusion into the threaded inner opening of the insert to the specified torque value while the mounting assembly is fastened to the separate mechanical asset results in the exact rotational orientation corresponding to the specific rotational orientation of the sensor relative to the separate mechanical asset.

12. The mounting system of claim 1, wherein the sleeve includes an upper surface configured to contact and provide a physical stop against a bottom surface of the sensor when the threaded portion of the sensor protrusion is inserted into and sufficiently rotated within the threaded inner opening.

13. The mounting system of claim 12, wherein the insert has an upper surface arranged to be lower than or flush with the upper surface of the sleeve.

14. A method of mounting a sensor to a separate mechanical asset using the mounting system of claim 1, the method comprising:

coupling the mounting assembly to the threaded opening within the separate mechanical asset, wherein the coupling includes inserting the threaded protrusion of the fastening component into the threaded opening of the separate mechanical asset;

setting a rotational orientation of the sleeve with respect to the separate mechanical asset while the flange of the fastening component remains within an inner volume of the sleeve and the threaded protrusion extends away from the sleeve and into the threaded opening of the separate mechanical asset;

tightening the fastening component into the threaded opening of the separate mechanical asset until the sleeve cannot freely rotate with respect to the fastening component or to the separate mechanical asset; and coupling the sensor to the mounting assembly by rotatably inserting the sensor protrusion threaded portion into the threaded inner opening of the insert while the insert is fitted within the inner volume such that the sensor is coupled to the separate mechanical asset at a specific rotational orientation relative to the separate mechanical asset.

15. The method of claim 14, further comprising the steps of:

creating the mounting assembly;

forming the threaded opening within the separate mechanical asset;

tightening the sensor into the insert to a proper torque; and confirming that the specific rotational orientation is a proper relative rotation of the sensor separate mechanical component to the separate mechanical asset.

16. A mounting system configured to mount a sensor to a separate mechanical asset, the mounting system comprising:

the sensor, wherein the sensor includes a sensor protrusion with a threaded portion configured to facilitate mounting the sensor to the separate mechanical asset; and a mounting assembly configured to be coupled to the sensor, the mounting assembly including:

a fastening component including a threaded protrusion extending from a flange, the threaded protrusion defining a first diameter and the flange defining a second diameter that is greater than the first diameter, wherein the threaded protrusion is configured to be rotationally inserted into a threaded opening of the separate mechanical asset, and wherein the fastening component includes a tightening feature at a top surface of the flange, the tightening feature configured to facilitate rotational tightening of the threaded protrusion into the threaded opening of the separate mechanical asset;

a sleeve having one or more walls coupled to an endcap at one end thereof to define an inner volume having a sleeve opening at another end opposite the endcap, the inner volume being configured to hold the flange therein such that the flange is rotatable within the inner volume, wherein the endcap includes an endcap opening configured to allow the threaded protrusion to pass therethrough while the flange remains within the inner volume; and an insert fitted within the sleeve opening such that the insert is unable to move relative to the sleeve and the flange is fully constrained within the inner volume, the insert including a threaded inner opening configured to accept a rotational insertion therein of the sensor protrusion threaded portion such that the sensor is configured to mount to the separate mechanical asset at a specific rotational orientation relative to the separate mechanical asset, wherein the tightening feature of the fastening component is configured to be accessed via the threaded inner opening of the insert while the flange is fully constrained within the inner volume of the sleeve.

17. The mounting system of claim 16, wherein the specific rotational orientation of the sensor is achieved automatically when the sensor is tightened into the threaded inner opening at a designated preset torque value.

18. The mounting system of claim 16, wherein each of the fastening component, the sleeve, and the insert defines a central longitudinal axis, and wherein each of these central longitudinal axes align with each other and are configured to align with central longitudinal axes of the threaded opening of the separate mechanical asset and the sensor protrusion threaded portion when the mounting assembly mounts the sensor to the separate mechanical asset.

19. The mounting system of claim 16, wherein the mounting assembly is configured such that all threads of the sensor protrusion threaded portion, the threaded inner opening of the insert, the threaded protrusion of the fastening component, and the threaded opening of the separate mechanical asset are configured to be unexposed to ambient environment when the mounting assembly mounts the sensor to the separate mechanical asset.

20. The mounting system of claim 16, wherein the sensor is a vibration sensor.

* * * * *